United States Patent [19]

Martinez

[11] Patent Number: 4,643,163
[45] Date of Patent: Feb. 17, 1987

[54] BARBECUE OVEN

[75] Inventor: Cesar G. Martinez, San Antonio, Tex.

[73] Assignee: Roto-Flex Oven Co., San Antonio, Tex.

[21] Appl. No.: 809,426

[22] Filed: Dec. 16, 1985

[51] Int. Cl.$^4$ ............................................. A47J 37/00
[52] U.S. Cl. ................................ 126/41 A; 432/142;
432/144; 99/482; 219/385
[58] Field of Search ................... 432/142, 144; 99/423,
99/446, 482; 126/41 A; 219/385, 386, 389, 400

[56] References Cited

U.S. PATENT DOCUMENTS

| | | | |
|---|---|---|---|
| 1,844,150 | 2/1932 | Fiske | 432/142 |
| 1,876,843 | 9/1932 | Bolling | 432/142 |
| 3,425,364 | 2/1969 | Martin | 432/65 |
| 4,355,570 | 10/1982 | Martin et al. | 99/482 |
| 4,528,439 | 7/1985 | Marney et al. | 219/385 |

Primary Examiner—Henry C. Yuen
Attorney, Agent, or Firm—Gunn, Lee & Jackson

[57] ABSTRACT

A rotating shelf barbecue oven for commercial establishments is shown. Meats being barbecued are located on shelves in an upper compartment while heat and smoke for barbecuing comes from a lower compartment. Flues in the side walls provide for flow of heat and smoke from the lower compartment to the upper compartments. A shaft extends through the upper and lower compartments and connects to the shelves for rotating the shelves and meats thereon during barbecuing. The compartments, including the flues and the shaft, are constructed to allow for steam cleaning of the upper compartment without the water getting into the lower compartment. Also cooking grease is prevented from dripping into the lower compartment.

9 Claims, 3 Drawing Figures

BARBECUE OVEN

BACKGROUND OF THE INVENTION

The present invention relates to a barbecue oven and, more particularly, to a barbecue oven having an upper compartment and a lower compartment designed for use by commercial establishments. The upper compartment has shelves carried by a rotating shaft, which rotating shaft extends downward through the lower compartment. Meats being barbecued are located on the rotating shelves.

The heat and smoke for barbecuing are created in the lower compartment and flow through flues in the side walls to the upper compartment. However, the flues and shaft are constructed to (1) allow for steam cleaning of the upper compartment without water flowing to the lower compartment, and (2) prevent cooking grease from dripping from the upper compartment to the lower compartment.

BRIEF DESCRIPTION OF THE PRIOR ART

Many different types of barbecue ovens have been designed and built in the past, including barbecue ovens that are designed for use with commercial establishments. Typically a commercial establishment, such as a restaurant, will have a barbecue oven that will barbecue large quantities of meat at one time. In prior barbecue ovens, if meat being barbecued was left in one location, some portions of the meat would cook much quicker than other portions of the meat. Therefore, a number of years ago, ovens that had rotating shelves were developed by the Assignee of this invention. For example, Assignee is the owner of U.S. Pat. No. 3,425,364 by Martin, which is a patent for a rotating shelf oven. The Martin oven (which is not a barbecue oven) has an inherent problem because there is no separation between the heating zone and the burner. In other words, grease droppings could possibly get to the burner and could possibly ignite.

Further, in the cleaning of the heating compartment as shown in Martin, steam or other cleaning fluids being used to clean the heating compartment could also get into the same compartment containing the burner. In the cleaning of the oven, it is highly undesirable for cleaning fluids and steam to come in contact with the burners or the heating compartment. These undesirable features have been eliminated with the present invention.

Since 1967, Assignee has manufactured and sold various types of ovens for use by commercial establishments, including those having rotating shelves on which the products are cooked. A printed publication showing the various types of ovens made and sold by applicant (which printed publication has been distributed by applicant for over one year) is entitled "Quality By Design" by Roto Flex Oven Company. The brochure illustrates the various types of ovens having a rotating center shelf that have been made and sold by applicant. These ovens are generally designed on the same principle as aforementioned U.S. Pat. No. 3,425,364.

Also Assignee has made and sold a barbecue oven, which is illustrated in a brochure entitled "Genuine Texas Bar-B-Q" distributed by Assignee. The oven described in the "Genuine Texas Bar-B-Q" brochure has been made and sold by more than one year. Specifications for the "Genuine Texas Bar-B-Q" oven are further given in a publication by Assignee entitled "Smoker Specifications" dated in 1982.

Other competitors of Assignee have also made and sold to the public various types of barbecue ovens that are basically in competition with Assignee. However, ovens made by such competitors have a number of inherent problems. First, these ovens are normally unitary in construction and require a large opening through which the oven must be moved for installation. Thereafter if the oven is relocated, a hole will have to be knocked in the wall to relocate the oven. These competing ovens are welded solid thereby not permitting the ovens to be disassembled and moved through an ordinary door.

It is important that any commercial barbecue oven be large enough to handle the capacity of meats normally associated with barbecue restaurants and at the same time have the capability of being moved or relocated if necessary. While the oven should not only have the capability of being disassembled and moved, the oven should separate the cooking compartment from the source of heat and smoke. This allows for ease of cleaning of the cooking compartment and at the same time preventing grease drippings from reaching the burner area. Such is not possible in the designs known to applicant.

SUMMARY OF THE INVENTION

It is an object of the present invention to provide a barbecuing oven with a lower compartment providing the heat and smoke and an upper compartment containing the meat being barbecued.

It is another object of the present invention to provide a barbecuing oven for use in commercial establishments that can barbecue large amounts of meat at one time, which barbecuing oven may be assembled and disassembled for ease of installation or moving to another location.

It is still another object of the present invention to provide a barbecue oven for use in commercial establishments that has a lower compartment in which heat and smoke is generated. Flues connect the lower compartment to an upper compartment in which the meat being barbecued is located. Meat in the upper compartment is continually rotated on rotating shelves during barbecuing.

It is yet another object of the present invention to provide an oven for barbecuing meat in a commercial establishment, which oven (1) separates the source of heat and smoke from the cooking compartment, and (2) is easy to move from one location to another.

The barbecue oven has an upper compartment and a lower compartment with a rotating shaft extending therethrough. Heat and smoke are provided in the lower compartment and flows via flues in the side walls to the upper compartment. In the upper compartment, shelves are attached to the hollow rotating shaft for rotation therewith. Heat and smoke that is used to barbecue the meat will flow through holes in the hollow rotating shaft out through appropriate ductwork located at the top of the barbecue oven. A motor located below the lower compartment will turn the hollow rotating shaft.

A floor located between the upper compartment and the lower compartment seals the two compartments from each other. Drippings from the meat being barbecued are removed from the upper compartment by a drain pipe located in the floor.

While cleaning the upper compartment by steam or otherwise, deflectors located around the flues keep the water or steam from reaching the lower compartment. If by chance any water, steam, or grease is received inside of the flues, the water, steam, or grease is removed by appropriate ductwork without ever reaching the lower compartment, the source of heat and/or smoke. By use of a cylinder inside of a cylinder, the hollow rotating shaft on which the shelves are mounted isolates the upper compartment from the lower compartment. By use of overlapping concentric cylinders, neither grease droppings nor steam during cleaning will flow around the rotating shaft from the upper compartment to the lower compartment.

The walls of the barbecue oven are insulated so that even while barbecuing meats, an individual can touch the side of the barbecue oven and not burn himself. Appropriate controls and timing mechanisms control the cycle for barbecuing the meats.

DESCRIPTION OF THE PREFERRED EMBODIMENT

Figure 1:
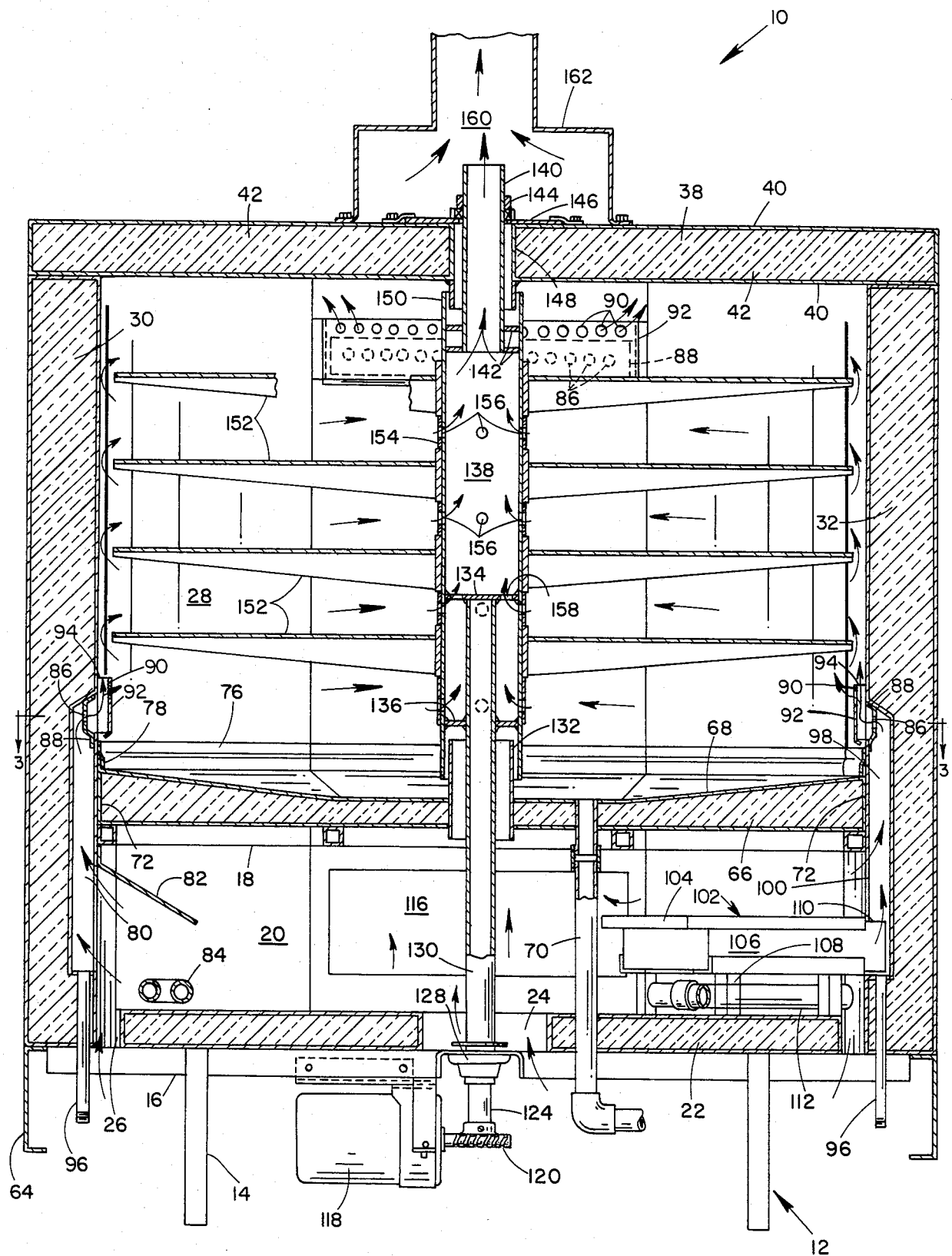
FIG. 1 is an elevated cross-sectional view of a barbecue oven showing the invention.
Figure 2:
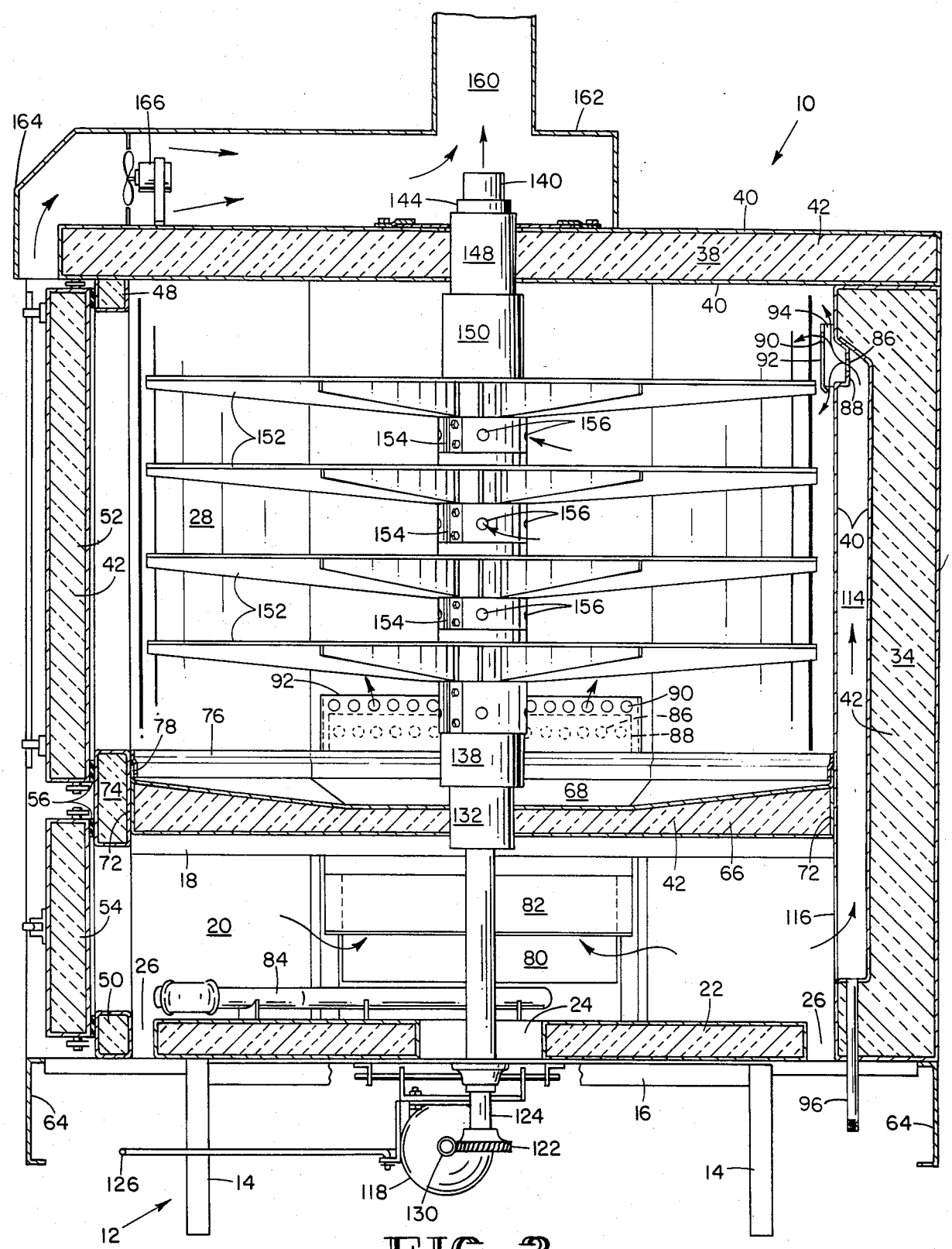
FIG. 2 is a sectional view of FIG. 1 taken along section lines 2—2, except the center shaft and shelves have not been sectioned.
Figure 3:
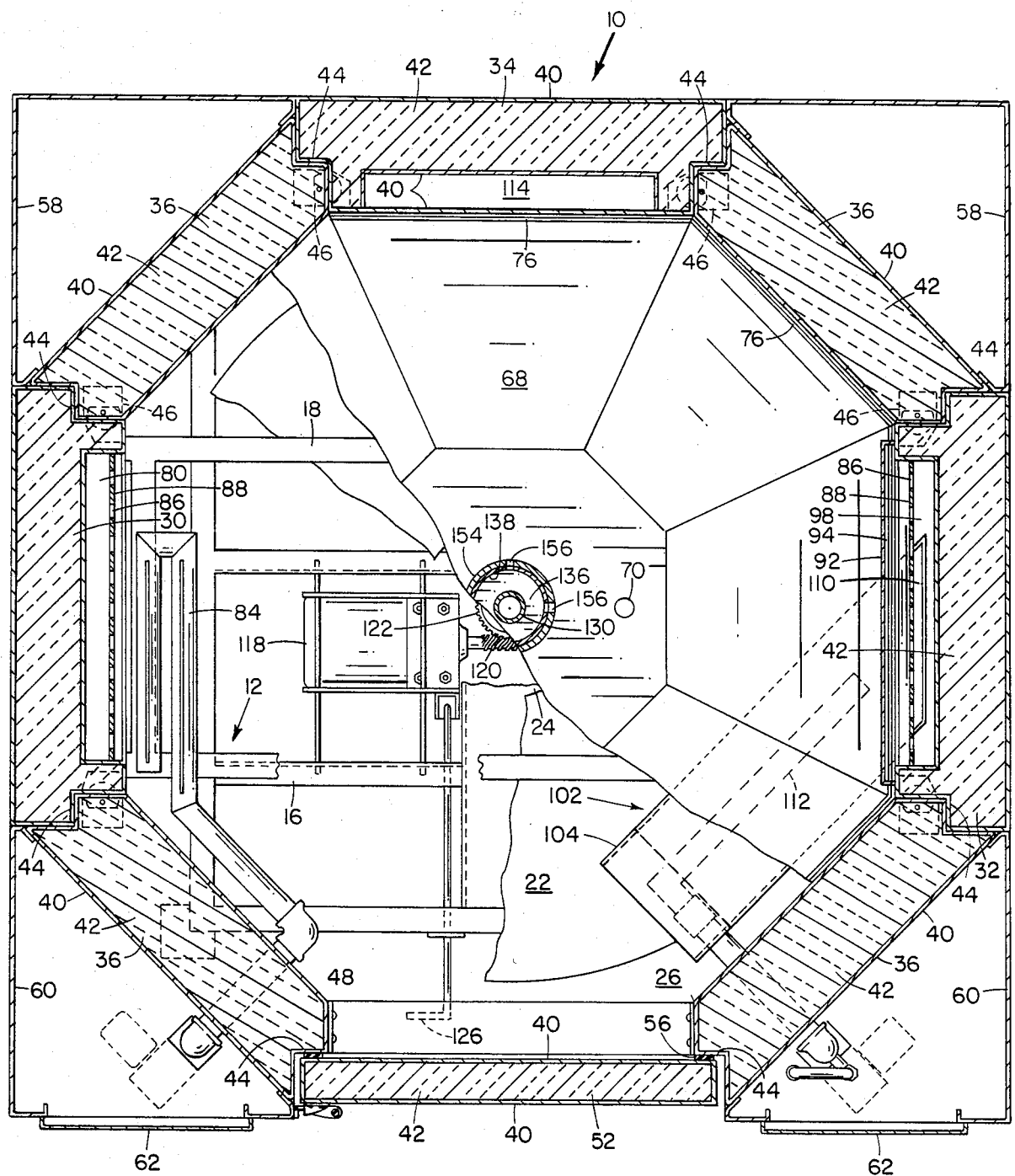
FIG. 3 is a sectional view of FIG. 1 taken along section lines 3—3 with additional partial sectional views of an intermediate floor and lower floor for illustration purposes.

Referring to FIG. 1 of the drawings in combination with FIGS. 2 and 3, there are shown cross-sectional views of the barbecue oven represented generally by reference numeral 10. The barbecue oven 10 is mounted on a stand 12 that has downwardly extending legs 14, a lower frame 16, and an upper frame 18. Located between the lower frame 16 and the upper frame 18 is a lower compartment 20 that has the heating and smoking elements located therein. Located on the lower frame 16 is a floor 22 that has an opening 24 in the center thereof and an opening 26 around the edge thereof.

The lower compartment 20 and an upper compartment 28 (as will be subsequently described in more detail) are enclosed by insulated removable walls as will be described hereinbelow. Side walls 30 and 32, back wall 34, and corner walls 36 all extend from lower frame 16 on which they rest to the insulated top 38 of the barbecue oven 10. Side wall 30 is essentially identical to side wall 32 and all of the corner walls 36 are identical. Side wall 30, side wall 32, back wall 34, corner walls 36, top 38, and floor 22 are all formed by two layers of sheet metal 40 with insulation 42 located therebetween. Each of the walls (side walls 30 and 32, back wall 34, corner walls 36) are all connected together by offsets 44 as can be more clearly seen in FIG. 3. The offsets 44 allow each of the walls to be bolted together and still prevent heat from escaping from the barbecue oven between each of the respective walls 30, 32, 34, or 36. The walls 30, 32, 34, and 36 are also held together by clamps 46 as shown in broken lines in FIG. 3. Clamps 46 pull the respective walls 30, 32, 34, and 36 together.

Closing the front of the barbecue oven 10 is an upper frame 48 and lower frame 50 on which are mounted upper door 52 and lower door 54, respectively. Upper door 52 and lower door 54 are again formed of sheet metal 40 and insulation 42 generally the same as the walls 30, 32, 34, and 36 as described hereinabove. A flexible sealant 56 that can withstand high temperatures is located around the doors 52 and 54 to provide a good seal with the corner walls 36.

It should be realized that none of the panels as described hereinabove are welded to any of the other panels. If any cracks remain inside of the lower compartment 20 (other than openings 24 and 26) and the upper compartment 28, such cracks are sealed by a high temperature caulking material that can withstand temperatures in excess of 500° F.

Since the walls 30, 32, 34, and 36 form an octagonal shaped lower compartment 20 and upper compartment 28, the entire barbecue oven 10 is made rectangular by adding rear corner panels 58 and front corner panels 60 from sheet metal 40. Front panels 60 have doors 62 located therein for access to controls contained in the front corner panels 60. To prevent visibility below the barbecue oven 10, a shroud 64 extends downward from the lower frame 16.

An intermediate floor 66 is located between upper compartment 28 and lower compartment 20. The intermediate floor 66 is formed from sheet metal 40 and insulation 42 in a manner somewhat similar to the previously described walls 30, 32, 34, and 36. The intermediate floor 66 has a concave upper surface 68 to direct grease during cooking, or steam or other cleaning fluids during the cleaning operation to a discharge duct 70. The discharge duct 70 may be connected to any suitable drainage line (not shown) below the floor 22 of lower compartment 20. The outer periphery 72 of the intermediate floor 66 abuts each of the walls 30, 32, and 34, corners 36 and the frame 74 between upper door 52 and lower door 54. A flange 76 overlaps an upper edge 78 of the concave upper surface 68 of the intermediate floor 66. The flange 76 also helps direct any grease, steam, or cleaning fluid toward the center of the concave upper surface 68 and out through discharge duct 70. The flange 76 is sealed against the walls 30, 32, and 34, corners 36 and upper frame 48 by as high temperature silicon sealant designed for use in temperatures in excess of 500° F.

In side wall 30 is located a flue 80 that extends around the intermediate floor 66. A deflector 82 in lower compartment 20 is located above burner 84 to direct heat from burner 84 through flue 80. Heat flowing through flue 80 flows through openings 86 in internal deflector 88 and into upper compartment 28 via opening 90 in external deflector 92 or between space 94 between external deflector 92 and side wall 30. In the event of cleaning of the upper compartment 28, the external deflector 92 will tend to keep the water or cleaning fluids from ever reaching the inside of flue 80. Internal deflector 88 provides further assistance to redirect any steam or cleaning fluid back inside of upper compartment 28 for discharge via concave upper surface 68 and discharge duct 70. The external surface of internal deflector 88 is sealed (except openings 86) by any convenient means, such as a high temperature silicon sealant. If some of the cleaning fluid or steam makes it past external deflector 92 and internal deflector 88, the condensed steam cleaning fluid and/or grease is removed by flue discharge duct 96.

In side wall 32 is also located a flue 98 that is constructed basically the same as flue 80 with the same numbers being used to designate the same component parts as previously described. Flue 98 has a lower opening 100 which receives the smoker box 102 therein. The smoker box 102 has a lid 104 on a metal box 106 that is mounted on stand 108. Between lid 104 and metal box 106 is an opening 110 located at one end thereof, which opening 110 is inserted through lower opening 100 of the flue 98. Mesquite chips or other wood chips to add the barbecue flavor are placed inside of metal box 106, the lid 104 placed into position, and the entire smoker box 102 located on stand 108 as shown in FIG. 2. To add heat to the chips of wood being burned for the smoke flavor, a burner 112 is located below smoker box 102. As the mesquite chips or other wood chips inside of smoker box 102 burn, the smoke flows through opening 110, flue 98, openings 86 and 90, into upper compartment 28.

Another flue 114 is located in back wall 34 (see FIG. 2). The lower opening 116 for the flue 114 can be seen in FIG. 1. The discharge for the flue 114 is near the top of upper compartment 28. Again, the discharge portion of flue 114 is the same as previously described flue 88, therefore identical numbers as applied to flue 80 are used for the discharge portion of flue 114.

A motor 118 is pivotally mounted below lower frame 16 and floor 22. The motor 118 has a screw gear 120 for engagement with gear 122 of shaft 124. By pulling handle 126, a person may engage or disengage screw gear 120 from gear 122 of shaft 124.

Shaft 124 extends upward through thrust plate 128, which supports the downward force exerted against shaft 130. Shaft 130 rotates as shaft 124 rotates, which shafts 124 and 130 are connected through thrust plate 128. Shaft 130 extends upward through intermediate floor 66 via concentric cylinder 132. Concentric cylinder 132 is attached to and sealed with intermediate floor 66. The upper end of shaft 130 is connected by horizontal plates 134 and 136 to a shelf support cylinder 138. The upper end of shelf support cylinder 138 is held by upper shaft 140, which is connected thereto by upper plates 142. The upper shaft 140 is secured to the top 38 by means of bearings 144 and bearings plate 146. The upper shaft 140 extends through the top 38 by extending through upper concentric cylinder 148, which overlaps with the upper end 150 of the shelf support cylinder 138.

Shelves 152 are made in two semi-circular halves which are then bolted together on shelf support cylinder 138 by means of clamps 154. A pin (not shown) prevents the shelves 152 from rotating with respect to the shelf support cylinder 138.

Openings 156 are provided through clamps 154 and shelf support cylinder 138 to allow the flow of heat and smoke between the shelves 152 into the inside of shelf support cylinder 138. Opening 158 in horizontal plate 134 aids the flow of heat and smoke through the lower part of shelf support cylinder 138. The heat and smoke inside of shelf support cylinder 138 continues to flow upward through upper shaft 40 and out through discharge opening 160 of vent duct 162. The discharge opening 160 of vent duct 162 would typically extend external to the building in which the barbecue oven 10 is located.

Because of convection currents, the air, heat, and smoke will flow by normal convection in the direction as indicated by the arrows in FIGS. 1 and 2. During the cleaning of the upper compartment 28, the overlapping concentric cylinders that surround shaft 130 and upper shaft 140 prevent any of the cleaning fluids, steam, or water from flowing out of the upper compartment 28 except the minor portions as will be taken care of through flue discharge ducts 96.

To prevent heat and smoke from accumulating inside of the building in which the barbecue oven is located upon opening or closing of the doors 52 and 54, a shroud 164 extends from vent duct 162 to immediately above upper door 52. By use of a fan 166 inside of shroud 164, heat or smoke that may escape from upper compartment 28 on the opening of upper door 52 is drawn off and subsequently discharged through discharge opening 160 of vent duct 162.

In typical operation of the barbecue oven 10, the meats being barbecued would be placed on the shelves 152, and the motor 118 turned ON to rotate the shelves 152. Barbecue chips, such as mesquite, are placed inside of smoker box 102 and the burners 84 and 112 are ignited. The heat and smoke flow from the lower compartment 20 to upper compartment 28 via flues 80, 98, and 114. After flowing over the meats being barbecued, the heat and smoke flow through openings 156 into shelf support cylinder 138 and are discharged via upper shaft 140 and discharge opening 160 to the atmosphere. The rotating of the shelves 152 insures uniform barbecuing of the meat inside of upper compartment 28.

After the barbecuing has been completed and the barbecued meats removed, steam can be injected inside of upper compartment 28 along with cleaning fluids. The cleaning fluids, steam, and water will then flow out of upper compartment 28 by the concave upper surface of intermediate floor 66 and discharge duct 70 without coming in contact with the lower compartment 28. Any minor amounts that may collect inside of flues 80, 98, and 114 are discharged by flue discharge ducts 96.

Because each section of the barbecue oven 10 is simply bolted together with any sealing being by means of a caulking compound, such as a high temperature silicon caulking compound, the barbecue oven 10 may be disassembled and moved to another location through ordinary doors. While the controls for the barbecue oven 10 have not been shown, mechanical or electrical controls would typically be located in front corner panels 60 behind doors 62. The controls are basically the same as prior controls that have been used by Assignee in the past.

It should be realized that many variations of the present invention may be made without departing from the scope or intent of the present invention, which is claimed hereinbelow.

I claim:

1. A barbecue oven comprising:
    a supporting frame;
    a plurality of connectable side panels supported by said supporting frame;
    a door frame for an upper and lower door supported by said supporting frame, said door frame with said upper and lower doors and said plurality of said connectable side panels forming a walled area;
    a floor in said walled area, said floor having openings therein to allow air flow therethrough;
    a top on said walled area, said top having a top opening therein;
    intermediate floor inside said walled area forming an upper compartment accessible through said upper door and a lower compartment accessible through said lower door, said intermediate floor being substantially sealed to said plurality of said connectable side panels and said door frame;

means for generating heat and/or smoke in said lower compartment;

flue means formed in said connectable side panels allowing said heat and/or smoke to flow therethrough from said lower compartment, around said intermediate floor, and into said upper compartment, wherein said upper compartment is substantially sealed from said lower compartment except through said flue means, said flue means having deflectors to prevent fluids, such as grease, cleaning fluids, or water, from flowing to said lower compartment;

shaft means extending upward through said upper compartment with shelves therein being connected to said shaft means, shaft openings allowing said heat and/or smoke to flow therethrough and out said top opening; and means for rotating said shaft means.

2. The barbecue oven as recited in claim 1 wherein said shaft means includes lower concentric cylinders in said intermediate floor to prevent said fluids from flowing to said lower compartment, said intermediate floor having drain means therefrom.

3. The barbecue oven as recited in claim 2 wherein said shaft means includes upper concentric cylinders in said top with bearing means for holding an upper end of said shaft means.

4. The barbecue oven as recited in claim 2 wherein said deflectors include an internal and external deflector at an upper opening of said flue means into said upper compartments, said deflectors having deflector openings to allow said heat and/or smoke to flow therethrough.

5. The barbecue oven as recited in claim 1 includes a smoker box in said lower compartment, a smoker box opening being located at a lower opening for said flue means.

6. The barbecue oven as recited in claim 1 wherein said side panels, door frame, floor, top, intermediate floor, and shaft means may be disconnected, relocated through normal door openings, and reassembled, high temperature sealant being used to seal between said upper compartment and said lower compartment.

7. The barbecue oven as recited in claim 1 wherein said upper compartment and said lower compartment are octagonal in shape, said barbecue oven being insulated against heat in said connectable side panels, doors, and top.

8. A barbecue oven comprising:

a supporting frame;

a plurality of connectable side panels supported by said supporting frame;

a door frame for an upper and lower door supported by said supporting frame, said door frame with said upper and lower doors and said plurality of said connectable side panels forming a walled area;

a floor in said walled area, said floor having openings therein to allow air flow therethrough;

a top on said walled area, said top having a top opening therein;

intermediate floor inside said walled area forming an upper compartment accessible through said upper door and a lower compartment accessible through said lower door, said intermediate floor being substantially sealed to said plurality of said connectable side panels and said door frame, said intermediate floor being concave with a discharge duct therein to drain fluids from said upper compartment;

means for generating heat and/or smoke in said lower compartment;

flue means formed in said connectable side panels allowing said heat and/or smoke to flow therethrough from said lower compartment, around said intermediate floor, and into said upper compartment, wherein said upper compartment is substantially sealed from said lower compartment except through said flue means;

shaft means extending upward through said upper compartment with shelves therein being connected to said shaft means, shaft openings allowing said heat and/or smoke to flow therethrough and out said top opening; and means for rotating said shaft means.

9. The barbecue oven as recited in claim 8 further comprising flue ducts at a lower end of said flue means to remove fluids from said flue means to prevent entry into said lower compartment.

* * * * *